(12) United States Patent
Høier et al.

(10) Patent No.: US 9,187,246 B2
(45) Date of Patent: Nov. 17, 2015

(54) METHODS FOR STORING CARBON DIOXIDE COMPOSITIONS IN SUBTERRANEAN GEOLOGICAL FORMATIONS AND ARRANGEMENTS FOR USE IN SUCH METHODS

(75) Inventors: Lars Høier, Stavanger (NO); Bamshad Nazarian, Stavanger (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 13/807,673

(22) PCT Filed: Jun. 30, 2011

(86) PCT No.: PCT/EP2011/061009
§ 371 (c)(1),
(2), (4) Date: Mar. 15, 2013

(87) PCT Pub. No.: WO2012/001105
PCT Pub. Date: Jan. 5, 2012

(65) Prior Publication Data
US 2013/0170910 A1    Jul. 4, 2013

(30) Foreign Application Priority Data
Jul. 1, 2010   (NO) .................................. 20100960

(51) Int. Cl.
*B65G 5/00*     (2006.01)
*E21B 41/00*    (2006.01)
*E21B 43/16*    (2006.01)

(52) U.S. Cl.
CPC ............. *B65G 5/00* (2013.01); *E21B 41/0064* (2013.01); *E21B 43/164* (2013.01); *Y02C 10/14* (2013.01)

(58) Field of Classification Search
CPC ..... B65G 5/00; E21B 41/0064; E21B 43/164; Y02C 10/14
USPC ............................... 405/53, 59, 129.1, 129.35
See application file for complete search history.

(56) References Cited

U.S. PATENT DOCUMENTS

| 3,438,203 | A | * | 4/1969 | Lamb et al. | ...................... 405/59 |
| 3,519,076 | A | * | 7/1970 | Walker | .......................... 166/268 |
| 3,538,340 | A | * | 11/1970 | Lang | ............................... 290/52 |

(Continued)

FOREIGN PATENT DOCUMENTS

| EP | 1571105 A2 | 9/2005 |
| JP | 6170215 A | 6/1994 |

(Continued)

OTHER PUBLICATIONS

Wei et al., CN101190743 Machine Translation, Apr. 2008.*

(Continued)

*Primary Examiner* — Benjamin Fiorello
(74) *Attorney, Agent, or Firm* — Volpe and Koenig, P.C.

(57) ABSTRACT

A method of introducing a $CO_2$ composition into an aquifer for storage of $CO_2$ therein, said method comprising injecting $CO_2$ in a supercritical state into said aquifer at one or multiple first vertical positions; and withdrawing brine solution from said aquifer at one or multiple second vertical positions; wherein any one of said first vertical positions is distinct from any one of said second vertical positions is disclosed. An arrangement for introducing a $CO_2$ composition into an aquifer is also disclosed.

13 Claims, 3 Drawing Sheets

(56) References Cited

U.S. PATENT DOCUMENTS

| | | | |
|---|---|---|---|
| 4,365,978 A * | 12/1982 | Scott | 95/255 |
| 4,609,043 A | 9/1986 | Cullick | |
| 4,626,131 A * | 12/1986 | Glew et al. | 405/59 |
| 4,632,601 A * | 12/1986 | Kuwada | 405/129.35 |
| 4,701,072 A * | 10/1987 | Berezoutzky | 405/53 |
| 4,991,624 A * | 2/1991 | Fowler et al. | 137/594 |
| 5,129,759 A * | 7/1992 | Bishop | 405/59 |
| 5,394,942 A | 3/1995 | Catania et al. | |
| 5,722,792 A * | 3/1998 | Morisseau | 405/59 |
| 7,150,320 B2 * | 12/2006 | Heins | 166/266 |
| 2005/0167103 A1 * | 8/2005 | Horner et al. | 166/268 |
| 2006/0204337 A1 * | 9/2006 | McCoy et al. | 405/53 |
| 2009/0202304 A1 * | 8/2009 | Koide et al. | 405/129.2 |
| 2010/0116511 A1 * | 5/2010 | Ramakrishnan et al. | 166/400 |
| 2010/0129155 A1 * | 5/2010 | Kearney | 405/59 |
| 2010/0170674 A1 * | 7/2010 | Blount et al. | 166/267 |
| 2010/0200227 A1 * | 8/2010 | Satchell et al. | 166/256 |
| 2011/0013986 A1 * | 1/2011 | Zebrowski | 405/53 |
| 2011/0038670 A1 * | 2/2011 | Wilkinson | 405/53 |
| 2012/0003043 A1 * | 1/2012 | Cawley et al. | 405/53 |

FOREIGN PATENT DOCUMENTS

| | | |
|---|---|---|
| JP | 2008082023 A | 4/2008 |
| WO | 0018681 A1 | 4/2000 |
| WO | 2009071001 A1 | 6/2009 |
| WO | 2010024949 A2 | 3/2010 |

OTHER PUBLICATIONS

Takashi et al.; JP 2008082023 Machine Translation; Apr. 10, 2008; All pages.*

John R Wilkinson et al. "Subsurface design for safe, efficient and reliable carbon dioxide storage projects" IPTC 13072, Dec. 7, 2009, pp. 1-7 XP55010278.

Metz et al. Carbon Dioxide Capture and Storage IPCC, 2005 (whole document) Cambridge University Press, UL also available at: http://www.ipcc.ch).

Sasaki et al., "Numerical Simulation of Supercritical CO2 Injection Into Subsurface Rock Masses," Energy Conversion and Management, vol. 49, pp. 54-61 (2008).

* cited by examiner

METHODS FOR STORING CARBON DIOXIDE COMPOSITIONS IN SUBTERRANEAN GEOLOGICAL FORMATIONS AND ARRANGEMENTS FOR USE IN SUCH METHODS

This application is a 35 USC §371 national stage application of PCT/EP2011/061009, which was filed Jun. 30, 2011 and incorporated herein by reference as if fully set forth.

The invention relates to methods for introducing carbon dioxide ($CO_2$) into subterranean geological formations and to arrangements for use in such methods.

BACKGROUND OF THE INVENTION

The increase of $CO_2$ in the atmosphere is suspected to have a major effect on global climate. It is therefore desired that the emission of anthropogenic $CO_2$ into the atmosphere is reduced. In addition to the development of low $CO_2$ emission power plants, energy-saving automobiles and the increased use of renewable energy sources, the permanent storage of $CO_2$ in subterranean geological formations can be an important means for reducing net $CO_2$ emission.

An extensive review of existing $CO_2$ Capture and Storage (CCS) projects and technology is given in the IPCC Special report on Carbon Dioxide Capture and Storage (Carbon Dioxide Capture and Storage, IPCC, 2005, editors: Metz et al., Cambridge University Press, UK).

$CO_2$ injection into a subterranean geological formation for Enhanced Oil Recovery (EOR) has been applied in the Rangely EOR Project in Colorado, USA. A sandstone oil reservoir has been flooded with $CO_2$ by a water-alternating-gas (WAG) process since 1986. In this project, $CO_2$ in a supercritical state is used to extract additional amounts of oil from the otherwise exhausted oil fields in a tertiary oil recovery process. By the end of 2003, 248 active injectors of which 160 are used for $CO_2$ injection and 348 active producers were in use in the Rangely field. Injection of $CO_2$ occurs through openings at various vertical positions over the entire height of the reservoir. Production of oil also occurs at various vertical positions over the entire height of the reservoir. Injection wells and production wells are horizontally offset from each other. The Rangely Project does not store $CO_2$ in aquifers.

The Sleipner Project, operated by Statoil in the North Sea, is a commercial scale project for the storage of $CO_2$ in a subterranean aquifer. $CO_2$ is stored in supercritical state 250 km off the Norwegian coast. About one million tons of $CO_2$ is removed from produced natural gas and subsequently injected underground, annually. $CO_2$ injection started in October 1996 and by 2008, more than ten million tons of $CO_2$ had been injected at a rate of approximately 2700 tons per day. The formation into which the $CO_2$ is injected is a brine-saturated unconsolidated sandstone about 800-1000 m below the sea floor. A shallow long-reach well is used to take the $CO_2$ 2.4 km away from the producing wells and platform area. The injection site is placed beneath a local dome of the top Utsira formation. No concurrent removal of brine from the reservoir occurs.

The In Salah CCS Project is an onshore project for the production of natural gas from a gas reservoir located in a subterranean aquifer. The aquifer is located in the Sahara desert. The reservoir is in a carboniferous sandstone formation, 2000 m deep; it is only 20 m thick, and of low permeability. Natural gas containing up to 10% of $CO_2$ is produced. $CO_2$ is separated, and subsequently re-injected into the water-filled parts of the reservoir. No brine solution is removed from the aquifer.

EP-A-1571105 describes methods for $CO_2$ storage, in which $CO_2$ is added at into a water stream, which stream is then pumped into a subterranean geological formation. The method uses chemical reactions with a mineral-forming agent (sulfate/base). The agent is added, unless use is made of particular geological structures, is in particular those structures that by nature contain these agents in large quantities. This method requires complex and expensive technical equipment. Since no concurrent removal of brine from the reservoir occurs, high local pressure at the site of injection may lead to fractures in the sealing geological formations. This increases the likelihood of $CO_2$ escaping from the reservoir into the atmosphere.

JP06170215 describes a method of introducing a mixture of water and $CO_2$ into a subterranean geological formation. For this purpose, the $CO_2$ is mixed with water above the ground, and thereafter the mixture is introduced into the ground, under high pressure. The method requires a supply of liquid $CO_2$, a booster pump, a heat exchanger and a pump to obtain the required pressure. This renders the process energy-intensive and expensive. Injection of the $CO_2$/water mixture into a reservoir increases the reservoir pressure and may lead to fractures in the sealing formations. This increases the risk of $CO_2$ escaping into the atmosphere.

WO 2010/024949 describes methods for sequestering $CO_2$ in an aquifer.

In view of the above described state of the art it is an object of the present invention to provide alternative methods for the permanent storage of $CO_2$ in subterranean geological formations.

It is a further object of the present invention to provide methods which allow for a more efficient use of the storage capacity of geological formations, such as aquifers, for permanent storage of $CO_2$.

It is a further object of the present invention to provide for a safer and more permanent storage of $CO_2$.

SUMMARY OF THE INVENTION

The scope of the invention is defined by the appended independent claims. Preferred embodiments of the invention are defined by the dependent claims.

The invention relates to a method of introducing a $CO_2$ composition into an to aquifer for storage of $CO_2$ therein, said method comprising injecting $CO_2$ in a supercritical state into said aquifer at one or multiple first vertical positions; and withdrawing brine solution from said aquifer at one or multiple second vertical positions; wherein any one of said first vertical positions is distinct from any one of said second vertical positions. Injection and production thus occur at distinct vertical positions.

In one embodiment, the lowest one of said first vertical positions is above the highest one of said second vertical positions, and the density of said $CO_2$ composition, at the respective sites of injection, is less than the density of said brine solution in said aquifer.

In this embodiment, said $CO_2$ composition is preferably injected into said aquifer at a position within an upwardly convex portion of said aquifer.

In an alternative embodiment, the highest one of said first vertical positions is lower than the lowest one of said second vertical positions, and the density of said $CO_2$ composition at the respective sites of injection, is greater than the density of said brine solution in said aquifer.

In this embodiment, said $CO_2$ composition is preferably injected into said aquifer at a position within a downwardly convex portion of said aquifer.

In another preferred embodiment, said aquifer is a confined aquifer, or is a closed aquifer.

In another preferred embodiment, the ratio of volume of $CO_2$ composition injected into said aquifer, at the site of injection, to the total volume of brine withdrawn from said aquifer is controlled. Preferably, said ratio is controlled to be from 0.6 to 1.4, more preferably from 0.8 to 1.2, most preferably from 0.9 to 1.1. In another preferred embodiment of the invention, the ratio of volume of $CO_2$ composition injected into said aquifer, at the site of injection, to the total volume of brine withdrawn from said aquifer is controlled to be substantially equal to one.

It is normally not necessary that the above ratio is constantly kept within the above defined limits, but it is normally sufficient that the average ratio over a certain period of time is within the defined ranges. For example, the average ratio of $CO_2$ injection to brine production over 1 day, over 1 week, over 1 month, or alternatively over 1 year are within the above mentioned ranges.

In another preferred embodiment, the density of said $CO_2$ composition at the site of injection is controlled.

In another preferred embodiment, said density is controlled by controlling a temperature of said $CO_2$ composition.

In another preferred embodiment, said density is controlled by controlling a pressure of said $CO_2$ composition.

In another preferred embodiment, said density is controlled by controlling the composition of said $CO_2$ composition.

In another preferred embodiment, said injection port is vertically aligned with said production port.

In another preferred embodiment, said injection port is horizontally offset said production port.

In another preferred embodiment, the amount of $CO_2$ injected per unit time, and the amount of brine produced per unit time, are controlled to a level such that the a local pressure in said aquifer, or the average pressure in said aquifer, remains constant.

In a preferred embodiment of the invention, $CO_2$ is injected through a single injection conduit or well, whereas brine is produced from multiple conduits or wells, preferably arranged radially displaced from, or around, said single injection conduit.

In another preferred embodiment of the invention, $CO_2$ is injected through multiple injection conduits or wells, whereas brine is produced from only a single conduit or well. The multiple injection conduits are then preferably arranged radially displaced from, or around, said single production conduit.

In another preferred embodiment of the invention, $CO_2$ is injected through multiple injection conduits or wells, and brine is produced from multiple conduits or wells.

In another preferred embodiment of the invention, $CO_2$ is injected through a single conduit or well, and brine is produced from a single conduit or well.

The invention also relates to an arrangement for use in the above methods.

The invention also relates to an arrangement for introducing a $CO_2$ composition into an aquifer, said arrangement comprising:

at least one first conduit each comprising an injection port, each injection port comprising one or more openings at first vertical positions, at least one second conduit each comprising a production port, each production port comprising one or more openings at second vertical positions, first flow-rate controlling means for controlling the volumetric flow-rate of $CO_2$ injected through said injection ports into said aquifer, second flow-rate controlling means for controlling the volumetric flow-rate of brine solution withdrawn from said aquifer through said production ports, density controlling means for controlling the density of said $CO_2$ at the site of injection, wherein each of said first vertical positions is distinct from each said second vertical positions.

It shall be understood that the density controlling means of the invention may be incorporated in, or be identical with, the first flow-rate controlling means (e.g. a controllable pump). In a preferred embodiment, however, the density controlling means and the first flow-rate controlling means are separate.

In a preferred embodiment, the lowest one of said first vertical positions is above the highest one of said second vertical positions, and said density controlling means is adapted to control the density of said $CO_2$ composition, at the site of injection, to a density below the density of said brine solution in said aquifer.

In this embodiment said injection port is preferably provided in an upwardly convex portion of said aquifer.

In an alternative embodiment, the highest one of said first vertical positions is below the lowest one of said second vertical positions, and said density controlling means is adapted to control the density of said $CO_2$, at the site of injection, to a density greater than the density of said brine solution in said aquifer.

In this embodiment, said injection port is preferably provided in a downwardly convex portion of said aquifer.

In another embodiment, there is provided one (separate) flow-rate controlling means for each said first conduits. In another preferred embodiment, there is provided one (separate) flow-rate controlling means for each said second conduits. Likewise there may be provided one (separate) density controlling means for each said first conduits.

In another preferred embodiment, said arrangement further comprises controlling means for controlling said first flow-rate controlling means and said second flow-rate controlling means.

In another preferred embodiment, said controlling means is adapted to control said first and second flow-rate controlling means to effect a ratio of the volumetric flow-rate of $CO_2$ injected, at the site of injection, to the volumetric flow-rate of brine produced of from 0.6 to 1.4, preferably 0.8 to 1.2, most preferred 0.9 to 1.1.

In another preferred embodiment, said first flow-rate controlling means is adapted to control the volumetric flow-rate of $CO_2$ based on a pressure measured in said aquifer.

In another preferred embodiment, said first flow-rate controlling means is adapted to control the volumetric flow-rate of $CO_2$ based on a pressure measured in said first conduit.

In another preferred embodiment, said second flow-rate controlling means is adapted to control the volumetric flow-rate of brine based on a pressure measured in said aquifer.

In another preferred embodiment, said second flow-rate controlling means is adapted to control the volumetric flow-rate of brine based on a pressure measured in said second conduit.

Preferably, the measured pressures are measured continuously.

In another preferred embodiment said first flow-rate controlling means and/or said second flow-rate controlling means are adapted to control said volumetric flow-rate of $CO_2$ and/or said volumetric flow-rate of brine, respectively, such that the pressure at the site of injection of $CO_2$ is below the formation fracture pressure of the aquifer.

In another preferred embodiment, said arrangement comprises said aquifer, and said aquifer is a confined aquifer.

In another preferred embodiment, said arrangement comprises said aquifer, and said aquifer is a closed aquifer.

In another preferred embodiment, said one or more openings of said injection ports are in a distal end portions of said at least one first conduit. The distal end portions are preferably deviated, slanted or substantially horizontal.

In another preferred embodiment, said one or more openings of said production ports are in a distal end portions of said at least one second conduit. The distal end portions are also preferably deviated, slanted or substantially horizontal.

In another preferred embodiment, said arrangement is adapted to inject said $CO_2$ composition into said aquifer in a supercritical state.

In another preferred embodiment, said first flow-rate controlling means and/or said second flow-rate controlling means comprise a controllable pump or a controllable valve.

In another preferred embodiment, said injection ports are horizontally offset each said production ports by a horizontal distance of at least 5 m, 10 m, 20 m, 50 m, 100 m, 200 m, 500 m, or 1000 m. In another preferred embodiment, said injection ports are horizontally offset each said production ports by a horizontal distance of less than 500 m, 1 km, or 2 km.

In a preferred embodiment of the invention, the arrangement includes a single first conduit and multiple second conduits. The multiple second conduits are preferably arranged radially displaced from, or around, said single first conduit. In another preferred embodiment of the invention, the arrangement includes multiple first conduits and a single second conduit. The multiple first conduits are then preferably arranged radially displaced from, or around, said single second conduit. In another preferred embodiment of the invention, the arrangement includes multiple first conduits and multiple second conduits. In another preferred embodiment of the invention, the arrangement includes a single first conduit and a single second conduits.

DETAILED DESCRIPTION OF THE INVENTION

Figure 1:
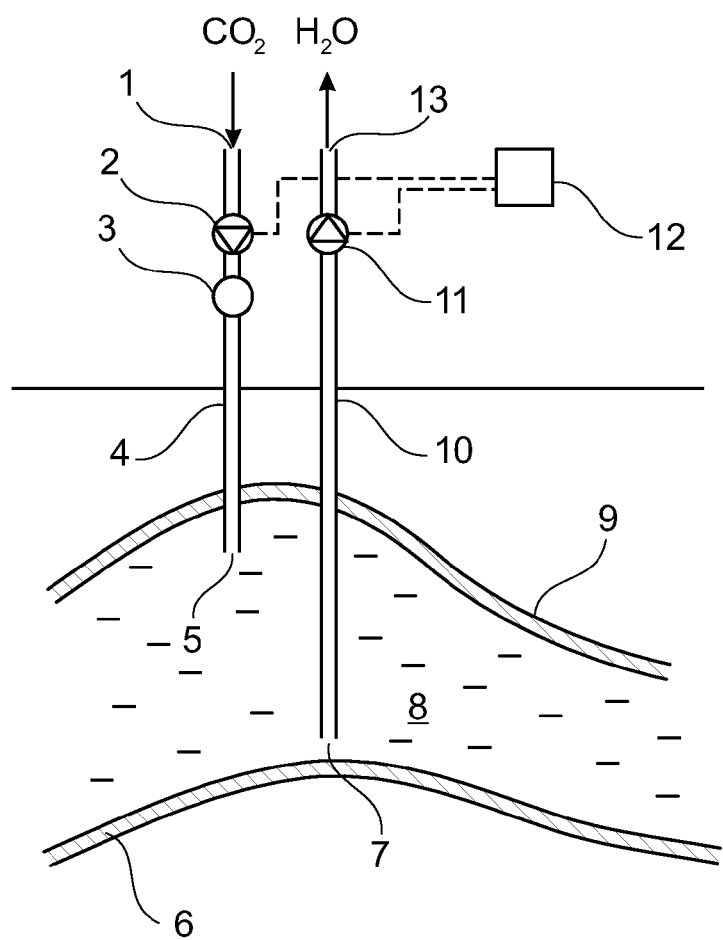
FIG. 1 shows a first embodiment of the invention.

An "aquifer", within the context of the present invention shall be understood as being an underground layer of water-bearing permeable rock or unconsolidated materials (gravel, sand, silt, or clay). An aquifer may be sealed by an aquitard or aquiclude at an upper or lower boundary. Such aquifers are hereinafter referred as "confined aquifers". An aquifer may also be sealed at both the upper and lower boundary. Such aquifers are hereinafter referred to as "closed aquifers". Preferred aquifers, according to the invention, are upwardly convex aquifers, or downwardly to convex aquifers. The "aquifer", within the context of the present invention, may also be referred to as the "reservoir".

An "aquitard", within the context of the present invention, is a zone or layer within the earth that restricts the flow of groundwater through the respective zone or layer. The zone or layer is preferably water-impermeable or has low water conductivity. Aquitards may comprise layers of either clay or non-porous rock with low hydraulic conductivity. Preferred aquitards have a hydraulic conductivity K of less than $10^{-4}$, preferably $10^{-5}$, or $10^{-6}$, or $10^{-7}$, and most preferably $10^{-8}$ cm/s. It shall be understood that the expression "confined aquifer" relates to the aquifer in its original state, e.g., before any manipulations (such as the introduction of $CO_2$ into the aquifer) took place.

An "aquiclude" (or "aquifuge"), within the context of the present invention, shall be understood as being a solid, impermeable area underlying or overlying an aquifer. Thus, an aquitard which is completely impermeable can be regarded as an aquiclude (or aquifuge).

"Brine", when used in the context of the present invention, shall be understood to generally relate to the water, or water phase present in an aquifer. The water typically comprises large amounts of salt, such as sodium chloride. The expressions "brine" and "brine solution" are used synonymously.

The "formation fracture pressure", according to the invention, shall be understood as being the pressure within a formation (e.g. an aquifer) above which further injection of fluid will cause the formation to fracture hydraulically. The formation fraction pressure, according to the present invention, may be calculated by the formula $P=FG*D$, wherein P denotes the formation fracture pressure, FG denotes the fracture gradient [in kPa/m] and D is the depth [in m] of the injection site. According to the present invention, preferred fracture gradients are FG=5 kPa/m, FG=10 kPa/m, FG=20 kPa/m, or FG=30 kPa/m. Accordingly, in one embodiment of the invention (FG=10 kPa/m), the formation fracture pressure is 30 MPa at a depth of D=3000 m.

A "site of injection", within the context of the present invention, shall be understood as being a position adjacent an opening of an injection port, through which opening $CO_2$ is injected into an aquifer; said position being outside an outer surface of said conduit or well. The expression "at the site of injection", in some embodiments, can be understood to mean "at reservoir conditions". These expressions are used synonymously.

A "site of production", within the context of the present invention, shall be understood as being a position adjacent an opening of a production port, through which brine solution is produced (i.e., withdrawn) from an aquifer; said position being outside an outer surface of said conduit or well. The expression "at the site of production", in some embodiments, can be understood to mean "at reservoir conditions". These expressions are used synonymously.

A "water table", within the context of the present invention, shall be understood as being the surface of the water saturated material in an aquifer. The water table need not necessarily be a flat surface, but can, in particular in dynamic situations, be of an irregular shape, e.g., a substantially upwardly convex surface, or a substantially downwardly convex surface.

The present invention relates to methods for storing $CO_2$ in subterranean geological formations, in particular, in subterranean aquifers.

The $CO_2$ injected is preferably a $CO_2$ composition compressed to assume a supercritical state at the site of injection, i.e., at reservoir conditions. The compressed gas may include $CO_2$ and additional compounds, which compounds preferably amount to less than 50% wt, 40% wt, 30% wt, 20% wt, 10% wt, 5% wt, 2% wt, most preferably to less than 1% wt, based on total compressed gas weight. The term "$CO_2$", according to the invention, and depending on the context, may relate to the above described mixtures of $CO_2$ and other components. The $CO_2$ injected is preferably not mixed with liquids, such as water or an aqueous solution, prior to injection. The $CO_2$ thus preferably does not contain liquid components.

$CO_2$, according to the invention, may be purposefully enriched with other substances, such as for example lower alkanes, for example methane, ethane, propane, and/or butane. This can be used to alter the density of the $CO_2$ composition in the supercritical state, at the site of injection. The density of the $CO_2$ may thus be adjusted to be above or below (or equal to) the one of the brine solution. The density of the $CO_2$ composition, at the site of injection, may also be adjusted by controlling the temperature and/or the pressure of the $CO_2$ composition at the site of injection. Suitable density controlling means may be provided for this purpose. Suitable density controlling means can be a pump, a heat exchanger or temperature controlling means, and/or a mixing unit (mixing means).

Methods of the present invention comprise both the injection of a $CO_2$ composition into an aquifer, and the production of brine from the same aquifer. Preferably, $CO_2$ is injected into the aquifer concurrently with the production of brine solution from the aquifer. In other embodiments, the start of production of brine is solution from the aquifer is delayed relative to the start of the injection of $CO_2$. The delay may be e.g. greater than 1 day, or greater than 1 week, or greater than 1 month. The delay may be up to, e.g., one year in total.

Production of brine from the aquifer serves to keep the average reservoir pressure at an approximately constant level (over time). In other words, build-up of pressure in the aquifer is effectively avoided. This, in turn, helps to reduce the risk of fractures in the sealing formations above and/or below the aquifer. Thus, it leads to a safer and more permanent storage of the $CO_2$ in the aquifer.

In certain embodiments of the invention, the flow-rate of CO2 injected and/or the flow-rate of brine produced are controlled to maintain the reservoir pressure at a level below the formation fracture pressure.

In another preferred embodiment, full voidage replacement is performed, i.e., the volume (at the site of injection) of CO2 injected is equal to the volume of brine produced.

It is to be understood that both injection and production can occur through one or through multiple conduits or wells. For example a single injection conduit for $CO_2$ can be provided, whereas production of brine occurs through multiple conduits or wells, preferably arranged radially displaced from the injection conduit or well. Likewise, injection may occur from multiple conduits or wells, while production of brine occurs through only a single conduit or well. There may, however, also be multiple injection conduits or wells and multiple production conduits or wells. In these cases, it is to be understood that the volume and flow-rate of $CO_2$ injected, and the volume and flow-rate of brine produced, are the combined volumes and flow-rates through all injection conduits and production conduits, respectively. This means that the sum of $CO_2$ volume injected is balanced with the sum of brine volume produced.

Concurrent injection of $CO_2$ and production of brine also leads to a more efficient sweep of the reservoir with $CO_2$, i.e., to a more complete replacement of the to initially present brine solution with $CO_2$. It is estimated that capacity of the geological storage will be several orders of magnitude greater than with conventional storage techniques. Methods of the present invention also reduce the so-called "fingering phenomenon", i.e., they minimize the size of by-passed areas in the aquifer. Thus, more efficient use of the reservoir capacity can be made. In certain embodiments of the present invention, the volumetric flow-rate of brine-solution produced (in $m^3$ per hour) is controlled on the basis of the volumetric flow-rate of $CO_2$ injected (in $m^3$ per hour, at the site of injection).

In a preferred embodiment, the volumetric flow-rate of $CO_2$ injected into the aquifer, at the site of injection, is substantially equal to the volumetric flow-rate of brine solution produced from the aquifer. In another preferred embodiment, the average volumetric flow-rate of injection of $CO_2$ into the aquifer, at the site of injection, is substantially equal to the average volumetric flow-rate of production of brine solution from the aquifer. The average volumetric flow-rate may be calculated over a period of e.g. 1 day, or 1 week, or 1 month, or 1 year.

In other preferred embodiments, the ratio of the volumetric flow-rate of injection of $CO_2$ injected into the aquifer, at the site of injection, to the volumetric flow-rate of brine solution produced from the aquifer is controlled to lie within the range from 0.6 to 1.4, more preferably from 0.8 to 1.2, most preferred from 0.9 to 1.1, or 1. In yet another preferred embodiment, the ratio of the average volumetric flow-rate of injection of $CO_2$ into the aquifer, at the site of injection (over e.g. 1 day, 1 week or 1 month), to the average volumetric flow-rate of production of brine solution from the aquifer (over, e.g., 1 day, 1 week, or 1 month), is controlled to lie within the range of from 0.6 to 1.4, more preferably from 0.8 to 1.2, most preferred from 0.9 to 1.1, or 1.

It is to be understood that flow rates, volumes, temperatures, pressures and compositions mentioned within the context of this invention, unless otherwise stated, are those at reservoir conditions.

Injection of $CO_2$ may be achieved by pumping the $CO_2$ down into a conduit or well, preferably through a conduit provided in said well. The $CO_2$ is injected into the aquifer through an injection port provided in said conduit. An injection port, according to the invention may comprise multiple openings. The multiple openings are suitably to provided in a distal end portion of the conduit. They may be provided in a horizontal portion, or a slanted portion, or a substantially horizontal portion, of the conduit. Injection of $CO_2$ into the aquifer may occur at a vertical position above the site of production of brine. This configuration is particularly advantageous in situations, where the density of the supercritical $CO_2$ composition is below the density of the brine is solution in the aquifer. In this case, the injected $CO_2$ will accumulate in an upper portion of the aquifer, and produce a water table therebelow. With the injection of further amounts of $CO_2$ into the aquifer, this water table will migrate downwardly, thereby replacing additional amounts of brine with $CO_2$. This migration of the water table with the concurrent replacement of brine with $CO_2$ is also referred to as a "sweep" (in this case, a downwardly directed sweep) through the reservoir.

Injection of $CO_2$ into the aquifer may, however, also occur at a vertical position below the site of production of brine. This configuration is particularly advantageous in situations, where the density of the supercritical $CO_2$ is greater than the density of the brine solution in the aquifer. In this case, the injected $CO_2$ will accumulate in a lower portion of the aquifer, and produce a water table thereabove. With the injection of further amounts of $CO_2$ into the aquifer, the water table will migrate upwardly in the aquifer, thereby replacing additional amounts of brine with $CO_2$. Thus, an upwardly directed sweep is achieved.

In methods of the present invention, the vertical position(s) of injection relative to the vertical position(s) of production are selected based on the density of CO2 injected, relative to the density of brine produced.

The invention shall now be explained with reference to the appended figures.

FIG. 1 generally shows an arrangement for introducing $CO_2$ into a subterranean aquifer according to a first embodiment of the present invention. A first conduit 4 is provided to transport $CO_2$ from a level substantially above surface into aquifer 8. First conduit 4 may be in form of a tube disposed within the casing of a well. Alternatively, the casing of the well itself may constitute first conduit 4. The well is a vertical well, or a slanted or deviated well. Alternatively, only an upper (proximal) portion of the conduit is substantially vertical or slanted or deviated.

In this embodiment, a production port 7 is arranged vertically below injection port 5, but also within aquifer 8. This configuration is advantageous, if the density of the $CO_2$ at the site of injection is lower than the density of the brine solution in aquifer 8. Production port 7 can be vertically aligned with injection port 5, but in the embodiment shown in FIG. 1 it is horizontally offset injection port 5.

In this configuration, injection port 5 is advantageously located in an upwardly convex portion (anticline) of aquifer 8. Injection port 5 is then preferably located beneath an upwardly convex portion of the aquiclude 9 defining the upper boundary of aquifer 8.

Figure 2:
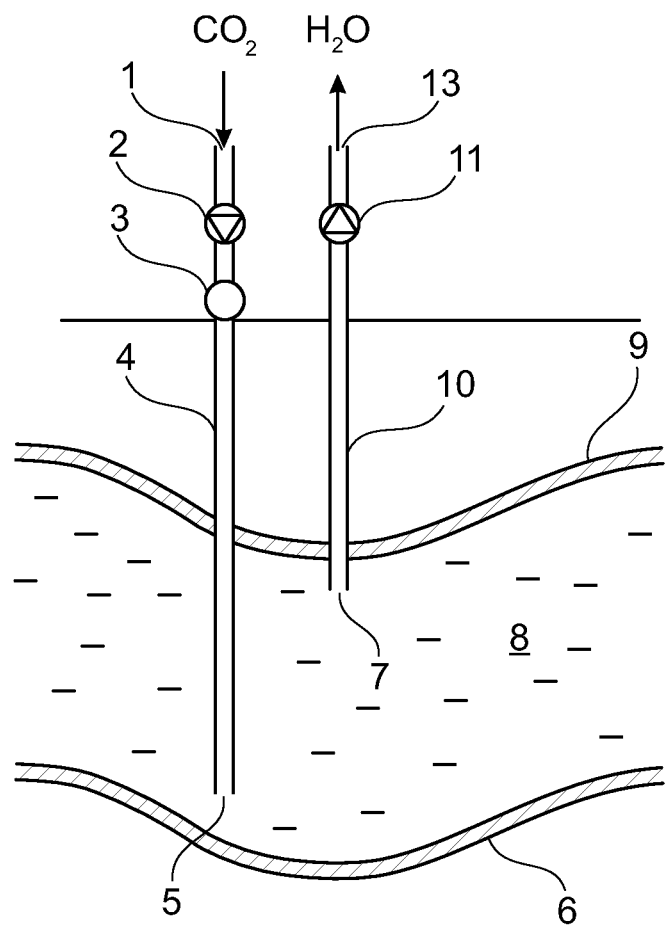
FIG. 2 shows a second embodiment of the invention.

Alternatively, as shown in FIG. 2, production port 7 can be arranged vertically above injection port 5, but within the same aquifer 8. This configuration is particularly advantageous, if the density of the $CO_2$ at the site of injection is greater than the density of the brine solution. Production port 7 can be vertically aligned with injection port 5, or can be horizontally offset injection port 5. In this embodiment, it is preferred that injection port 5 is located in a downwardly convex portion (a syncline) of aquifer 8. Injection port 5 is thus located above a downwardly convex portion of the aquiclude 6 defining the lower boundary of aquifer 8.

Figure 3:
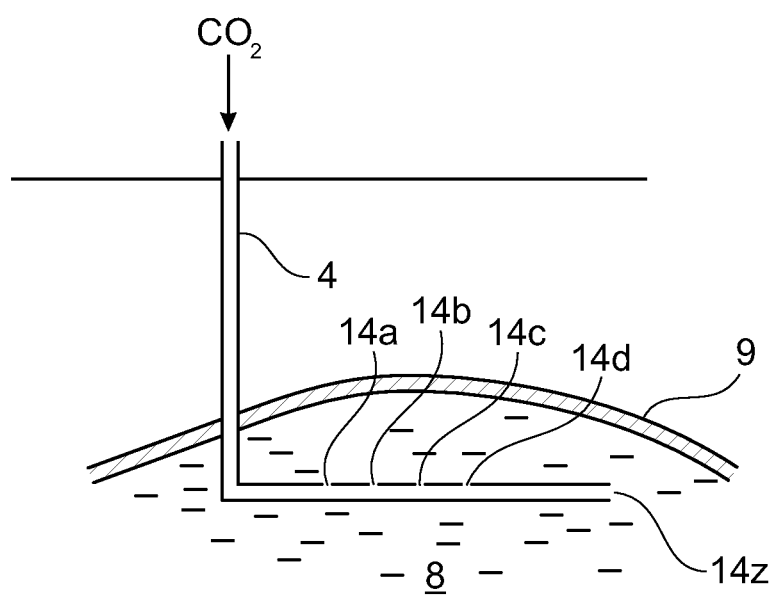
FIG. 3 shows a conduit according to the invention.

As depicted in FIG. 3, first conduit 4 may include a substantially vertical portion at a proximal region, and a substantially horizontal portion at a distal region of conduit 4. The horizontal portion of first conduit 4 is preferably arranged within the aquifer 8. First conduit 4 preferably includes a $CO_2$ inlet port 1 for receiving $CO_2$ from a suitable $CO_2$ source (not shown). $CO_2$ inlet port 1 may comprise connection means to connect to a suitable source of $CO_2$. Suitable sources of $CO_2$ are, e.g., a $CO_2$ pipeline or a $CO_2$ container.

First conduit 4 is provided in a well extending from above surface to a point within aquifer 8.

First flow-rate controlling means 2 are provided in association with first conduit 4. First flow-rate controlling means 2 are, e.g., provided in first conduit 4. First flow-rate controlling means 2 are provided for controlling the flow-rate of $CO_2$ in first conduit 4, or for controlling the amount of $CO_2$ injected at injection port 5 in a certain period of time. First flow-rate controlling means 2 preferably comprise a controllable pump, or a controllable valve, or both a controllable pump and a controllable valve.

In its simplest from, injection port 5 is a single opening in a distal end portion of to first conduit 4. Alternatively, as shown in FIG. 3, injection port 5 may comprise multiple openings 14a, 14b, 14c, . . . , 14z in a distal end portion of first conduit 4. The distal end portion of first conduit 4 is preferably substantially horizontal. Multiple openings in a substantially horizontal end portion enable the injection of $CO_2$ at multiple positions having substantially the same vertical position. The multiple openings may be in form of multiple slots within a distal end portion of first conduit 4. The multiple openings may be provided in a substantially horizontal portion of first conduit 4, or in a slanted or deviated portion of first conduit 4. Preferably, first conduit 4 is provided in a highly deviated well (a purposefully deviated well).

Preferably, the number of openings of injection port 5 is above 1, 2, 5, 10, 50, 100, 300, 500, or 1000. Likewise, the number of openings of injection port 5 is preferably below 2, 5, 10, 50, 100, 300, 500, 1000, 2000, or 5000. The distal end region is preferably located fully within the aquifer. Preferably, all openings of injection port 5 are within the same aquifer 8.

A distal end region, according to the invention, is preferably at least 5 m, 10 m, 20 m, 50 m, 100 m, or 200 m long. On the other hand, the distal end region is preferably less than 10 m, 100 m, 400 m, 800 m, 1.5 km, or most preferably less than 3 km long. A second conduit 10 comprises production port 7. In its simplest from, production port 7 is in form of an opening in a distal end portion of second conduit 10. Alternatively, production port 7 may comprise multiple openings in a distal end portion of second conduit 10. The distal end portion of second conduit 10 may comprise a substantially horizontal portion. Multiple openings in a substantially horizontal end portion enable the production of brine solution through multiple openings at substantially the same vertical height or level. The multiple openings may be in form of multiple slots within a distal end portion of second conduit 10. The multiple openings may also be provided in a substantially horizontal, or slanted, or deviated portion of second conduit 10.

By using multiple horizontal or slanted distal end portions, the number of openings in production port 7 can further be increased. Preferably, the number of openings of production port 7 is above 1, 2, 5, 10, 50, 100, 300, 500, or 1000. Likewise, the number of openings of production port 7 is preferably below 2, 5, 10, 50, 100, 300, 500, 1000, or 2000.

The distal end region is preferably located fully within the aquifer. Preferably, to all openings of production port 7 are within the same aquifer 8.

Second conduit 10 is provided to produce and/or transport brine from the aquifer 8 to a level substantially above the surface. Second conduit 10 is preferably in form of a tube disposed within a casing of a well. Alternatively, the casing of the well itself may constitute second conduit 10. The well is generally a vertical well, but can also be a slanted well. Preferably, at least an upper (proximal) portion of the well is substantially vertical. In preferred embodiments, second conduit 10 includes horizontal portion at its distal end. Horizontal portions of second conduit 10 are preferably fully within the aquifer 8. Second conduit 5 may thus be provided in a highly deviated well (a purposefully deviated well) to increase the possible number of openings 14a-14z for producing brine from the aquifer.

Second conduit 10 preferably includes an outlet port 13, substantially above surface. Outlet port 13 is adapted to provide brine solution to a reservoir or pipeline (not shown). For this purpose, outlet port 13 is provided with suitable connection means and/or valve means.

Second flow-rate controlling means 11 are provided in association with second conduit 10. Second flow-rate controlling means 11 are, e.g., provided in second conduit 10. Second flow-rate controlling means 11 are provided for controlling the flow-rate of brine solution in second conduit 10, or to control the amount of brine produced from production port 7. Second flow-rate controlling means 11 preferably comprise a controllable pump, or a controllable valve, or both a controllable pump and a controllable valve.

In one embodiment, all openings of injection port 5 are provided in an upper part of aquifer 8, and all openings of production port 7 are in a lower part of aquifer 8. An "upper part of an aquifer", in this context, shall be understood to relate to a the totality of positions within the aquifer, the vertical distance of which positions to the upper boundary 9 is less than the vertical distance of each said positions to the lower boundary 6. A "lower part of an aquifer" shall be understood to relate to a the totality of positions within the aquifer 8, the vertical distance of each of said position to the upper boundary 9 is greater than the vertical distance of said each position to the lower boundary 6 of the aquifer. This configuration is advantageous, if the density of CO2 injected into the aquifer is below the one of the brine solution produced from the aquifer.

In an alternative embodiment, all openings of injection port 5 are provided in a lower part of aquifer 8, and all openings of production port 7 are in an upper part of aquifer 8. This configuration is advantageous, if the density of CO2 injected into the aquifer is greater than the one of the brine solution produced from the aquifer.

EXAMPLES

Example 1

Carbon dioxide is mixed with n-butane at a ratio of 97 mol % CO2 and 3 mol % n-butane. The CO2 composition is added to an aquifer at a first vertical position and water is produced from the aquifer at a second vertical position. The $CO_2$ mixture, at reservoir conditions (p=700 bar, T=55° C.), has a density above the one of the extracted water (1000 kg/m3). The $CO_2$ composition is thus added to the aquifer at a vertical position below the vertical position of water production.

Example 2

A carbon dioxide composition contains 98 mol % $CO_2$ and 2 mol % C6 alkane. The $CO_2$ composition is added to an aquifer at a first vertical position and water is produced from the aquifer at a second vertical position. The $CO_2$ mixture, at reservoir conditions (p=700 bar, T=56° C.), has a density above the one of the water (1000 kg/m3). The $CO_2$ composition is thus added to the aquifer at a vertical position below the vertical position of water production.

Example 3

Carbon dioxide is mixed with butane at a ratio of 95 mol % $CO_2$ and 5 mol % mono ethylene glycol. The $CO_2$ composition is added to an aquifer at a first vertical position and water is produced from the aquifer at a second vertical position. The $CO_2$ mixture, at reservoir conditions (p=500 bar, T=40° C.), has a density above the one of the water (1000 kg/m3). The $CO_2$ composition is thus added to the aquifer at a vertical position below the vertical position of water production.

Example 4

Carbon dioxide is mixed with butane at a ratio of 97 mol % $CO_2$ and 3 mol % ethane. The $CO_2$ composition is added to an aquifer at a first vertical position and water is produced from the aquifer at a second vertical position. The $CO_2$ mixture, at reservoir conditions (p=100 bar, T=35° C.), has a density below 900 kg/m3. The $CO_2$ composition is thus added to the aquifer at a vertical position above the vertical position of water production.

Example 5

Carbon dioxide is mixed with butane at a ratio of 97 mol % $CO_2$ and 3 mol % C3 alkane. The $CO_2$ composition is added to an aquifer at a first vertical position and water is produced from the aquifer at a second vertical position. The $CO_2$ mixture, at reservoir conditions (p=200 bar, T=35° C.), has a density below 900 kg/m3. The $CO_2$ composition is thus added to the aquifer at a vertical position above the vertical position of water production.

The invention claimed is:

1. A method of introducing a $CO_2$ composition into an aquifer for storage of supercritical $CO_2$ therein, said method comprising injecting $CO_2$ in a supercritical state into said aquifer at one or multiple first vertical positions; withdrawing brine solution from said aquifer at one or multiple second vertical positions; and controlling the density of the $CO_2$ composition relative to the density of the brine solution at the site of injection; wherein any one of said first vertical positions is distinct from any one of said second vertical positions, and if the lowest one of said first vertical positions is above the highest one of said second vertical positions, the density of said $CO_2$ composition, at the respective sites of injection, is less than the density of said brine solution in said aquifer, or if the highest one of said first vertical positions is lower than the lowest one of said second vertical positions, the density of said $CO_2$ composition at the respective sites of injection, is greater than the density of said brine solution in said aquifer.

2. The method of claim 1, wherein the lowest one of said first vertical positions is above the highest one of said second vertical positions, and the density of said $CO_2$ composition, at the respective sites of injection, is less than the density of said brine solution in said aquifer.

3. The method of claim 2, wherein said $CO_2$ composition is injected into said aquifer in an upwardly convex portion of said aquifer.

4. The method of claim 1, wherein the highest one of said first vertical positions is lower than the lowest one of said second vertical positions, and the density of said $CO_2$ composition at the respective sites of injection, is greater than the density of said brine solution in said aquifer.

5. The method of claim 4, wherein said $CO_2$ composition is injected into said aquifer in a downwardly convex portion of said aquifer.

6. The method of claim 1, wherein the ratio of volume of $CO_2$ composition injected into said aquifer, at the site of injection, to the volume of brine withdrawn from said aquifer is controlled to be at a level of 0.6 to 1.4.

7. The method of claim 1, wherein the amount of $CO_2$ injected per unit time, and the amount of brine produced per unit time, are controlled to be at a level such that the average pressure in said aquifer remains constant.

8. An arrangement for introducing a $CO_2$ composition into an aquifer for storage of supercritical $CO_2$ therein, said arrangement comprising: at least one first conduit each comprising an injection port, each injection port comprising one or more openings at first vertical positions, at least one second conduit each comprising a production port, each production port comprising one or more openings at second vertical positions, a first flow-rate controller for controlling the volumetric flow-rate of $CO_2$ injected through said injection ports into said aquifer, a second flow-rate controller for controlling the volumetric flow-rate of brine solution withdrawn from said aquifer through production ports, a density controller for controlling the density of said $CO_2$ at the site of injection, wherein any one of said first vertical positions are distinct from any one of said second vertical positions, wherein the arrangement is adapted to inject the $CO_2$ composition into the aquifer in a supercritical state.

9. The arrangement of claim 8, wherein the lowest one of said first vertical positions is above the highest one of said second vertical positions, and said density controller is adapted to control the density of said $CO_2$ composition, at the site of injection, to a density below the density of said brine solution in said aquifer.

10. The arrangement of claim 8, wherein the highest one of said first vertical positions is below the lowest one of said second vertical positions, and said density controller is adapted to control the density of said $CO_2$, at the site of injection, to a density greater than the density of said brine solution in said aquifer.

11. The arrangement of claim 8, further comprising a controller for controlling said first flow-rate controller and said second flow-rate controller, and said controller is adapted to control said first flow-rate controller and said second flow-rate controller to effect a ratio of the volumetric flow-rate of $CO_2$ injected, at the site of injection, to the volumetric flow-rate of brine produced of from 0.8 to 1.2.

12. The arrangement of claim 8, wherein said first flow-rate controller comprises a controllable pump or a controllable valve.

13. The arrangement of claim 8, wherein said second flow-rate controller comprises a controllable pump or a controllable valve.

* * * * *